United States Patent [19]

Foltz

[11] Patent Number: 5,730,194
[45] Date of Patent: Mar. 24, 1998

[54] CAPLESS FILLER NECK CLOSURE SYSTEM

[75] Inventor: Dean C. Foltz, Shelbyville, Ind.

[73] Assignee: Stant Manufacturing Inc., Connersville, Ind.

[21] Appl. No.: 620,001

[22] Filed: Mar. 21, 1996

[51] Int. Cl.$^6$ ........................................ B65B 1/04
[52] U.S. Cl. ........................ 141/301; 141/302; 141/308; 141/312; 220/86.2; 137/588
[58] Field of Search ............................ 141/59, 301, 302, 141/305, 308, 348, 349, 350, 367, 312; 220/86.2; 137/587, 588

[56] References Cited

U.S. PATENT DOCUMENTS

| | | |
|---|---|---|
| D. 353,357 | 12/1994 | Weinberg et al. . |
| 3,527,268 | 9/1970 | Ginsburgh . |
| 3,642,036 | 2/1972 | Ginsburgh et al. . |
| 3,911,977 | 10/1975 | Berger . |
| 3,938,564 | 2/1976 | Jones . |
| 4,424,839 | 1/1984 | Otani et al. . |
| 4,651,889 | 3/1987 | Uranishi et al. . |
| 4,676,390 | 6/1987 | Harris . |
| 4,702,386 | 10/1987 | Boehmer et al. . |
| 4,741,369 | 5/1988 | Dawson . |
| 4,747,508 | 5/1988 | Sherwood . |
| 4,762,247 | 8/1988 | Temmesfeld . |
| 4,765,504 | 8/1988 | Sherwood et al. . |
| 4,881,655 | 11/1989 | Jansky et al. . |
| 4,883,103 | 11/1989 | Sziaga et al. . |
| 4,986,439 | 1/1991 | Ott et al. . |
| 5,022,433 | 6/1991 | Jansky et al. ............... 141/302 |
| 5,056,570 | 10/1991 | Harris et al. . |
| 5,186,220 | 2/1993 | Scharrer . |
| 5,195,566 | 3/1993 | Ott et al. . |
| 5,238,034 | 8/1993 | Corfitsen . |
| 5,242,075 | 9/1993 | Ott et al. . |
| 5,271,438 | 12/1993 | Griffin et al. . |
| 5,465,861 | 11/1995 | Kunz et al. . |

FOREIGN PATENT DOCUMENTS

| | | |
|---|---|---|
| 42 42 243 A1 | 12/1992 | Germany . |
| 42 43 833 A1 | 3/1996 | Germany . |
| 42 18 287 A1 | 9/1996 | Germany . |
| WO 94/05592 | 3/1994 | WIPO . |
| WO 94/06031 | 3/1994 | WIPO . |
| WO 96/05136 | 2/1996 | WIPO . |
| WO 96/05136 | 9/1996 | WIPO . |

Primary Examiner—J. Casimer Jacyna
Assistant Examiner—Steven O. Douglas
Attorney, Agent, or Firm—Barnes & Thornburg

[57] ABSTRACT

A filler neck is provided for delivering fuel in a vehicle fuel tank. The filler neck includes a conduit that formed to be coupled to a fuel tank inlet and has neck passageway. A partition unit is positioned in the conduit to divide the neck passageway into an outer chamber and an inner chamber and includes a partition channel interconnecting the outer and inner chambers. A filler neck shuttle is also positioned for movement in the neck passageway and the partition channel between a channel-opening position and a channel-closing position. The shuttle has a nozzle-receiving inlet, a fuel-discharging outlet for extension through the partition channel and into the inner chamber, and a fill passageway extending between the inlet and the outlet. Further, the filler neck includes a spring that yieldably urges the filler neck shuttle in the channel-closing position.

54 Claims, 8 Drawing Sheets

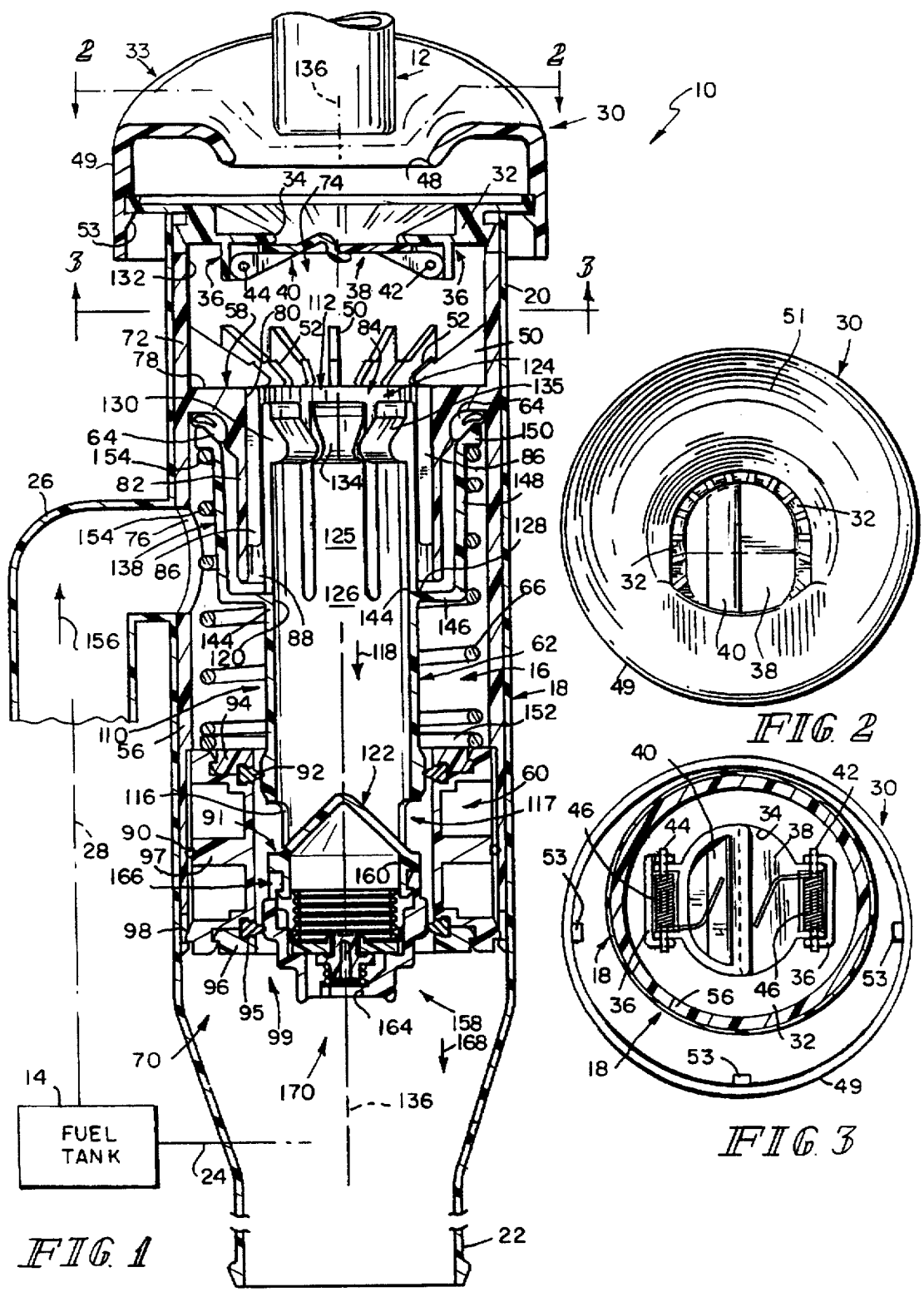

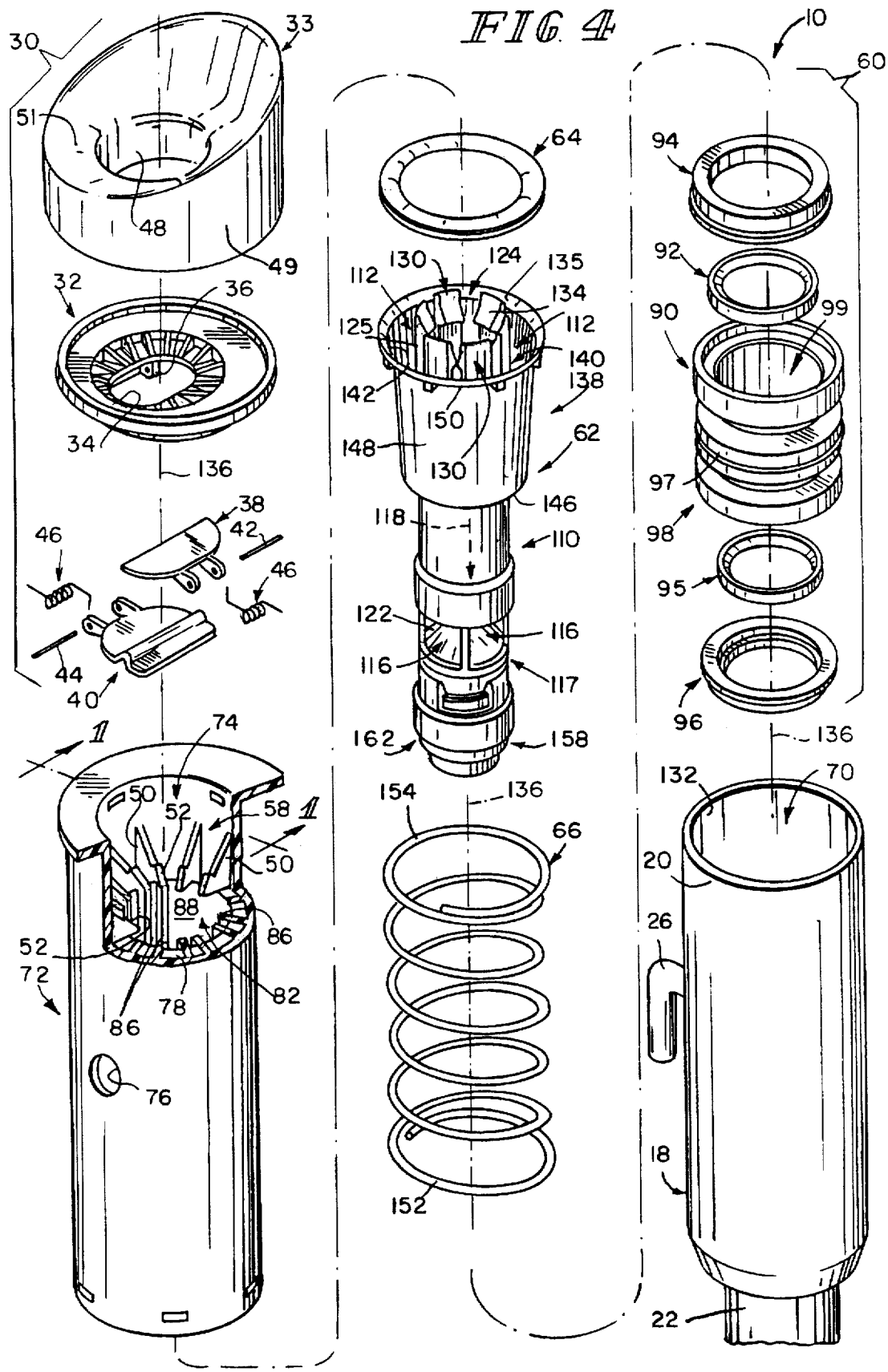

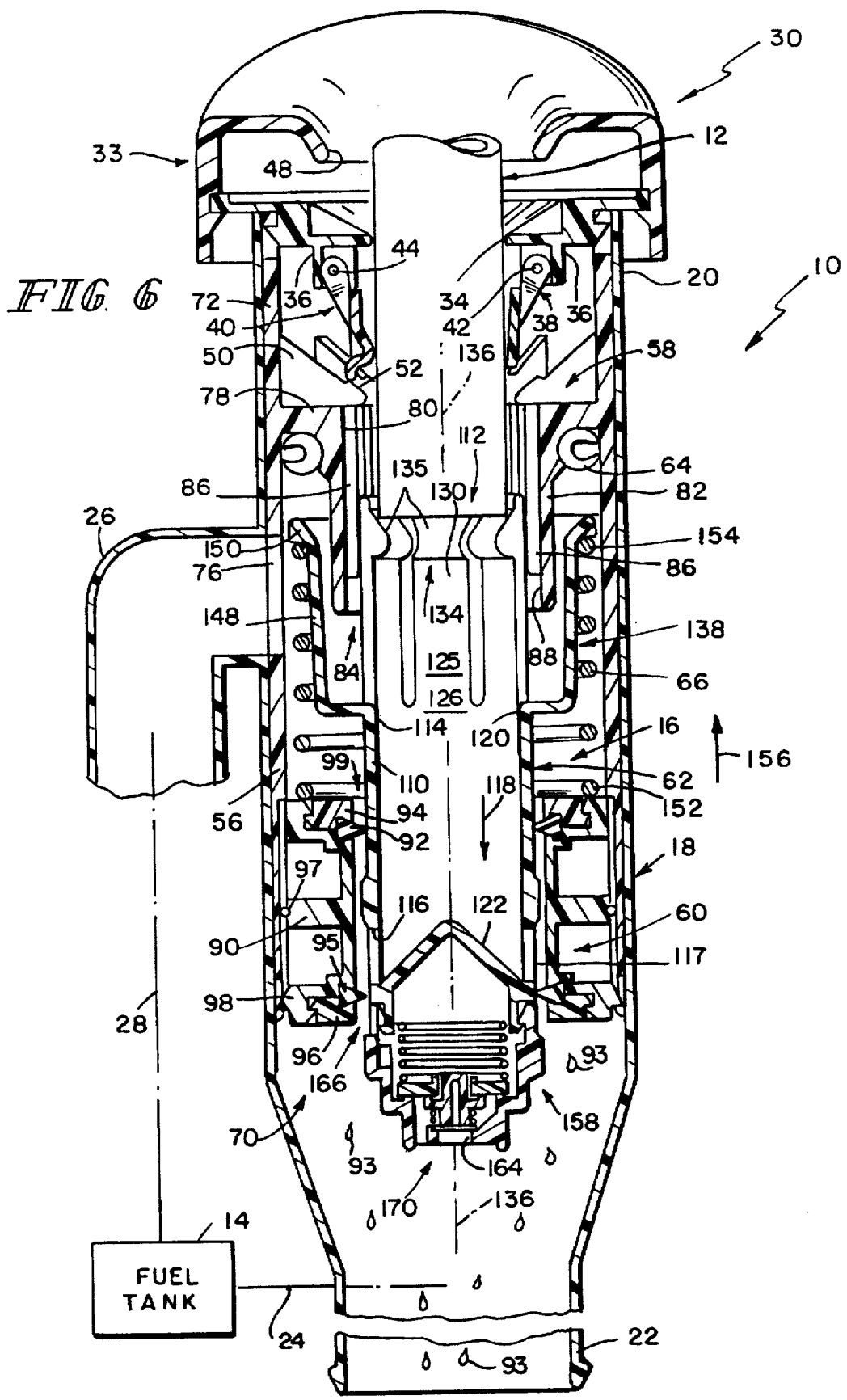

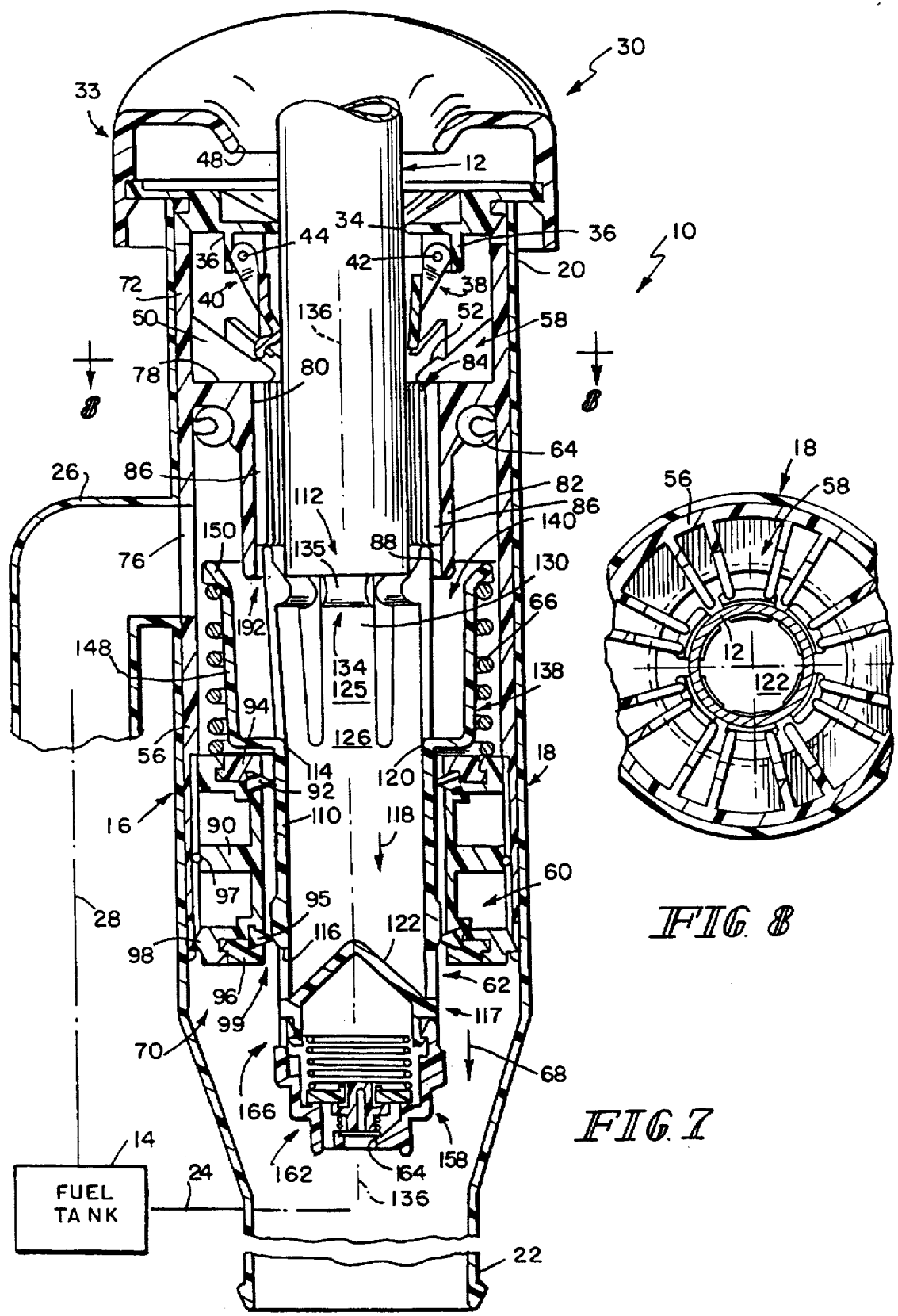

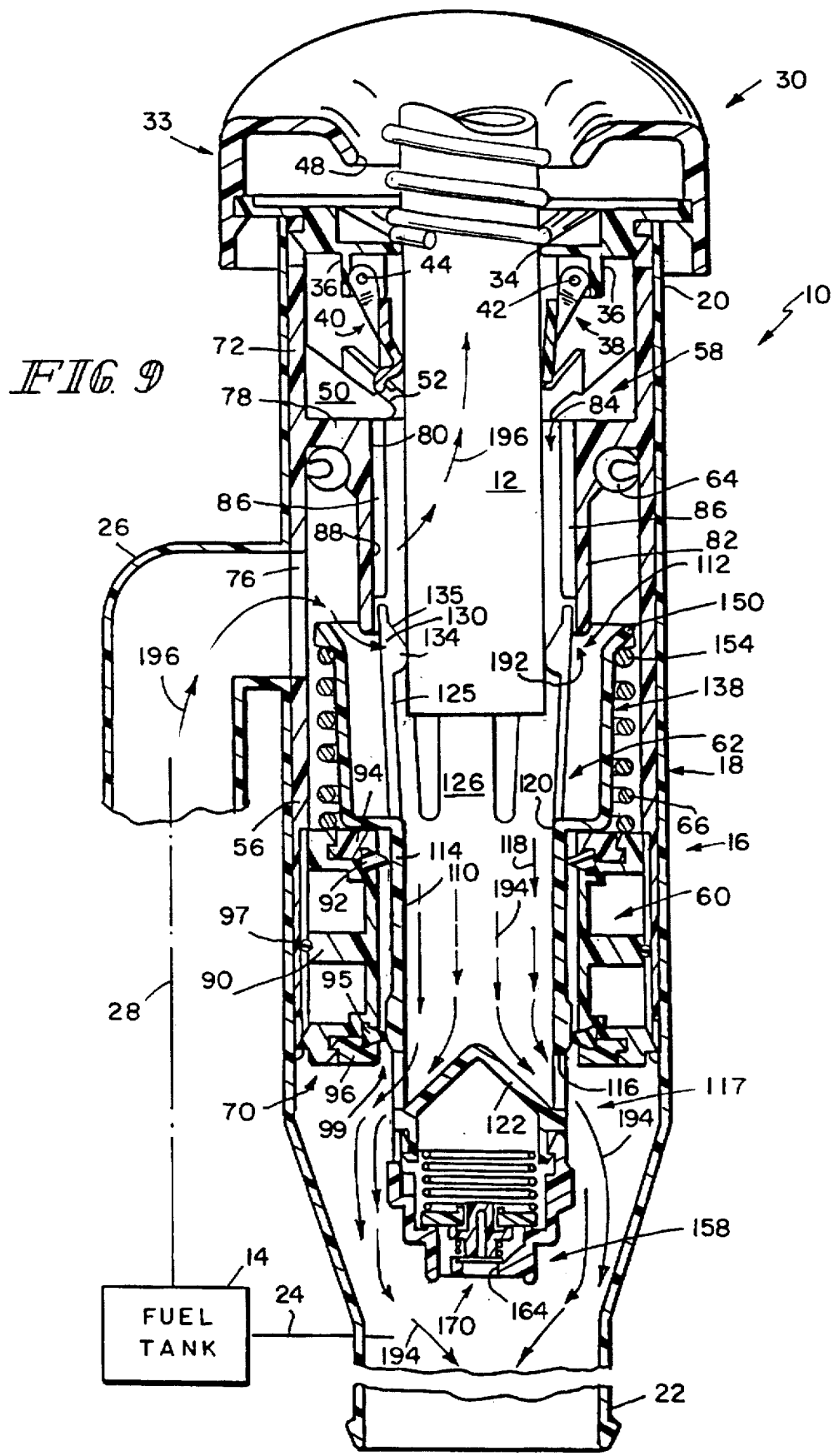

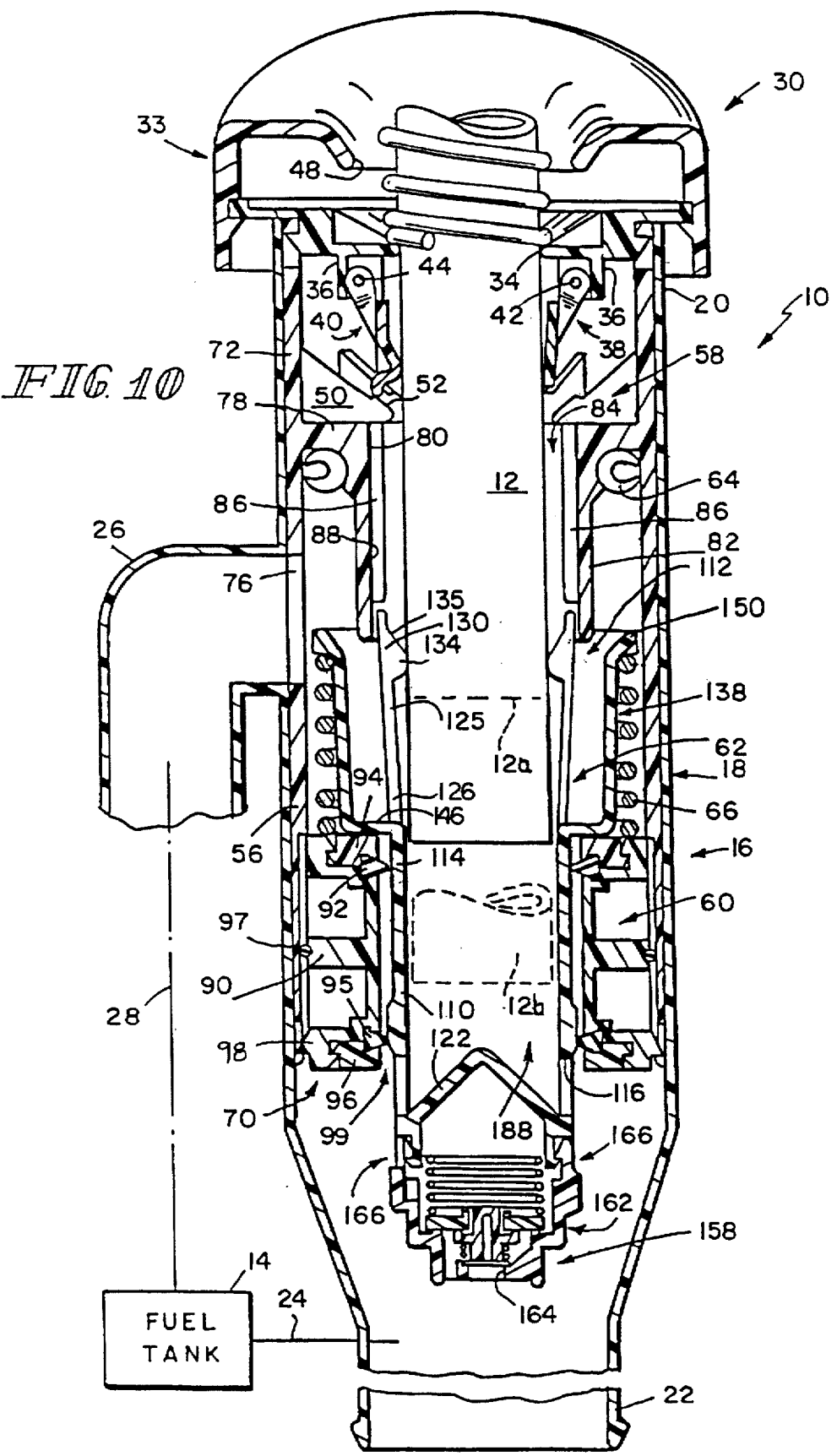

CAPLESS FILLER NECK CLOSURE SYSTEM

BACKGROUND AND SUMMARY OF THE INVENTION

The present invention relates to an assembly for controlling the closure of a vehicle fuel tank having a filler neck, and particularly to a filler neck without a removable outer fuel cap. More particularly, the present invention relates to a capless filler neck closure system having an internal opening and closing mechanism and a liquid fuel and fuel vapor handling system which controls the discharge of fuel vapors from the tank and the filler neck both during and after a tank-filling operation.

A removable fuel cap with a sealing gasket typically is used to close the open end of a fuel tank filler neck. Once the fuel cap is removed from the filler neck, the fuel tank is filled, and the fuel-dispensing nozzle is withdrawn from the filler neck, the fuel cap is reattached to the filler neck so that the sealing gasket forms a seal between the fuel cap and the filler neck. Thus, the fuel cap closes the open end of the filler neck to block discharge of liquid fuel and fuel vapor from the fuel tank through the filler neck. Additionally, some fuel caps are provided with pressure-relief and vacuum-relief valves to permit some controlled venting of fuel vapors in the filler neck and admission of outside air into the filler neck while the fuel cap is mounted on the filler neck.

It has been observed that fuel caps are often lost or damaged over time and, as a result, the open end of the filler neck might not be closed and sealed in accordance with the original equipment specifications during operation of the vehicle. Accordingly, a filler neck configured to "open" automatically as a fuel-dispensing pump nozzle is inserted into the filler neck during refueling and "close" automatically once the attendant withdraws the pump nozzle from the filler neck without requiring the attendant to reattach a fuel cap to the filler neck would be an improvement over many conventional capped filler neck systems. Although conventional fuel caps function to close filler necks in a satisfactory manner, it is thought that a capless filler neck closure system could make vehicle refueling more convenient for the consumer because no action other than inserting a pump nozzle into the open end of the filler neck would be required to begin refueling a vehicle.

Filler necks with self-closing closure mechanisms are known. A capless vehicle refueling system including a closure member that is movable by a fuel-dispensing nozzle to open a filler neck is disclosed in U.S. Pat. No. 5,056,570 to Harris and Griffin and U.S. Pat. No. 5,271,438 to Griffin, Harris, and Groom. U.S. patent application Ser. No. 08/426,239 to Foltz relates to a filler neck closure assembly that does not include a removable outer fuel cap. A quick-release fuel coupling for racing cars is disclosed in U.S. Pat. No. 3,938,564 to Jones. In addition, U.S. Pat. No. 5,195,566 to Ott et al.; U.S. Pat. No. 4,986,439 to Ott et al.; U.S. Pat. No. 4,702,839 to Boehmer et al.; and U.S. Pat. No. 4,424,839 to Otani et al. and German Document Nos. DE 42 18 287 A1 to Ott and DE 42 43 883 A1 to Soutter all disclose self-closing caps.

A robotic refueling system operates to detect a vehicle arriving at a vehicle-refueling station, locate a fuel tank filler neck in the vehicle, and move a fuel-dispensing pump nozzle automatically into and out of the filler neck at the proper times so that the fuel tank onboard the vehicle can be filled with fuel without any manual movement or operation of the pump nozzle by an attendant. For example, U.S. Pat. No. 5,238,034 to Corfitsen; U.S. Pat. No. 3,642,036 to Ginsburgh; and U.S. Pat. No. 3,527,268 to Ginsburg and German Document No. DE 42 42 243 A1 to Hagele all disclose automatic fueling systems for vehicles provided with filler neck closures suited for use with such systems.

A capless filler neck that is configured to control air and liquid flow into and out of the filler neck yet is assembled quickly and easily using only a few parts would be an improvement over known filler necks. There is a demand in the industry for an inexpensive yet effective capless filler neck that is reliable and easy to manufacture. An effective filler neck closure system that is compatible with robotic refueling systems will be needed once such robotic refueling systems become widely available. An improved filler neck that does not require the use of a conventional fuel cap and that is configured to open automatically both during refueling to permit fuel dispensed by a fuel nozzle to flow into a fuel tank through the filler neck and after refueling to relieve unwanted excess pressure and vacuum conditions in the tank would be welcomed by many vehicle manufacturers, vehicle owners, and service station attendants.

According to the present invention, a filler neck is provided with an internal tube called a filler neck shuttle that is movable to open and close the filler neck. The filler neck shuttle is formed to include a fill passageway that is configured to conduct fuel discharged by a fuel-dispensing nozzle toward a vehicle fuel tank when the filler neck is opened.

The filler neck includes a conduit having an outer end formed to include a mouth, an inner end formed a conduit outlet, and a neck passageway extending between the mouth and the conduit outlet and receiving the movable filler neck shuttle therein. The conduit outlet is adapted to be coupled to a fuel tank inlet via a fill tube or the like.

A partition unit is positioned in the conduit to divide the neck passageway into an outer chamber communicating with the mouth and an inner chamber communicating with the conduit outlet and thus the fuel tank. The partition unit is formed to include a partition channel extending therethrough. The partition channel interconnects the outer and inner chambers in the conduit.

The filler neck shuttle is positioned for reciprocating movement in the neck passageway and partition channel between a channel-opening position and a channel-closing position. The filler neck shuttle is formed to include a nozzle-receiving inlet configured to provide an opening into the fill passageway and positioned to face toward the mouth of the conduit and to receive the fuel-dispensing nozzle inserted therein during refueling. The shuttle is also formed to include a fuel-dispensing outlet for emptying liquid fuel discharged into the fill passageway by a nozzle from the fill passageway into the inner chamber upon movement of the shuttle to the channel-opening position. A spring is provided in the conduit to urge the shuttle toward its normal channel-closing position.

Preferably, in use, a fuel-dispensing nozzle is inserted by a user through the filler neck conduit and into the nozzle-receiving inlet and fill passageway provided in the movable filler neck shuttle. By manually pushing the nozzle further into the conduit and against the spring-loaded shuttle, the shuttle and its fill passageway can be moved through the partition channel formed in the partition unit to move the shuttle fuel-dispensing outlet into the inner chamber in the conduit so that liquid fuel discharged from the nozzle into the shuttle fill passageway can pass through the shuttle fuel-dispensing outlet into the inner chamber and on to the fuel tank.

In preferred embodiments, a shuttle guide is mounted in the outer chamber of the conduit to guide the moving filler neck shuttle as it reciprocates in and out between its channel-opening and channel-closing positions. The shuttle guide is mounted to lie in a position between the mouth of the conduit and the partition unit in the conduit. The shuttle guide is formed to include a guide channel receiving the movable filler neck shuttle therein.

In preferred embodiments, the filler neck shuttle includes a plurality of radially movable nozzle fingers appended to an outer end of the tube that is formed to define the fill passageway. These nozzle fingers are arranged to engage the fuel-dispensing nozzle as it is inserted into the filler neck during refueling and "push" the shuttle tube in an axially inward direction through the partition channel until the shuttle fuel-dispensing outlet is moved far enough into the filler neck to dispense liquid fuel from the fill passageway into the inner chamber formed in the conduit.

Each nozzle finger includes a blade having an inner end cantilevered to the shuttle tube and an opposite free end. A drive lug is appended to the free end of each blade and the drive lugs are arranged to engage a fuel-dispensing nozzle inserted into the mouth of the conduit during movement of the shuttle from its normal channel-closing position to its channel-opening position.

One advantage of a capless filler neck in accordance with the present invention is that it is configured to accommodate both long-length and short-length fuel-dispensing nozzles. At the present time there is no single standard length for fuel-dispensing nozzles used in vehicle filling stations. Ability to accept and locate the maximum variation in nozzle lengths is essential to any capless filler neck closure system. Lateral and longitudinal positioning of the exit point of the nozzle directs the fuel flow into the filler neck permitting maximum fill rates. In addition, State of California regulations require that provision be made to allow the fill nozzle to "latch" into the filler neck for "Hands Off" refueling. This requires the outer end of the filler nozzle to be placed in the same relative position to the outer end of the filler pipe or capless device, regardless of nozzle length. These conditions are provided in the subject design.

The shuttle guide is configured to allow outward radial deflection of the free ends of the nozzle fingers away from the axially extending longitudinal axis of the filler neck shuttle upon movement of the filler neck shuttle in the guide channel to the channel-opening position so that fuel-dispensing nozzles having a relatively long length can be inserted into the fill passageway formed in the filler neck shuttle during refueling. In use, the shuttle is pushed to its channel-opening position due to engagement of a moving fuel-dispensing nozzle against the drive lugs on the nozzle finger blades. Once the shuttle reaches its channel-opening position, the user is able to continue to push a long-length nozzle further into the filler neck because the tip of the moving nozzle disengages the drive lugs and moves against the blades to deflect the free ends of the blades in a radially outward direction and "enlarge" the inner diameter of the fill passageway provided in the filler neck shuttle.

Another advantage of a capless filler neck in accordance with the present invention is that it is provided with pressure-relief and vacuum-relief valve mechanisms. These mechanisms operate to vent excessive filler neck and fuel tank pressure and relieve excessive fuel tank vacuum when the filler neck shuttle is moved to its normal channel-closing position.

A vent valve assembly is appended to the filler neck shuttle to move therewith. The vent valve assembly includes a pressure-relief valve and a vacuum-relief valve that operate to control flow of air, fuel vapor, and liquid fuel between the fill passageway formed in the filler neck shuttle and the inner chamber formed in the conduit upon movement of the filler neck shuttle to the channel-closing position.

Also in preferred embodiments, an appearance cover is mounted to "cover" the mouth of the conduit to give the outward appearance that the capless filler neck is closed to provide comfort to consumers unable to see the internal closure mechanisms mounted in the filler neck conduit. The appearance cover is used in lieu of a conventional fuel cap and is configured to permit a fuel-dispensing nozzle to be inserted into the capless filler neck conduit manually by a user and/or automatically by a robotic refueling system.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a transverse sectional view of a "capless" filler neck in accordance with the present invention showing a movable filler neck shuttle in a channel-closing position in a filler neck conduit and in spaced-apart relation to an appearance cover unit mounted at the outer mouth of the filler neck conduit and showing an outer end of the filler neck shuttle positioned to lie in a guide channel formed in a shuttle guide mounted in the conduit and an inner end of the filler neck shuttle positioned to lie in a partition channel formed in a partition frame mounted in the conduit below the shuttle guide and to engage a pair of seal rings mounted in the partition channel;

FIG. 2 is a view of the filler neck of FIG. 1 taken along line 2—2 of FIG. 1 showing a top plan view of an appearance cover and portions of two pivotable closure doors visible through a central aperture formed in a base supporting the appearance cover;

FIG. 3 is a view taken along line 3—3 of FIG. 1 showing torsion springs arranged and biased to retain the two pivotable closure doors in their normal closed positions closing the central aperture formed in the base supporting the appearance cover;

FIG. 4. is an exploded assembly view of components included in the filler neck of FIG. 1 showing an appearance cover, a base for the appearance cover, two pivotable closure doors for mounting on the base to close a central aperture formed in the base, a shuttle housing containing the shuttle guide, a top sealing ring, a filler neck shuttle, a coiled shuttle spring, a partition unit including the partition frame and seal rings for mounting on the partition frame, a conduit formed to include a neck passageway configured to receive the shuttle housing, and a tank venting tube;

FIG. 6 is a view similar to FIG. 5 showing engagement of the tip of the nozzle against drive lugs appended to free ends of nozzle finger blades included in the filler neck shuttle after the nozzle has pushed the shuttle in an axially inward direction to cause the innermost end of the shuttle to disengage the innermost sealing ring mounted on the partition frame;

FIG. 7 is a view similar to FIG. 6 showing the filler neck shuttle in a channel-opening position during refueling but before fuel is dispensed from the nozzle into the fill passageway;

FIG. 8 is a transverse sectional view taken along line 8—8 of FIG. 7;

FIG. 9 is a view similar to FIG. 7 showing discharge of liquid fuel from the nozzle into the fill passageway formed in the filler neck shuttle, through the fuel-discharging outlet, and into the inner chamber formed in the conduit on its way toward the fuel tank and showing venting of displaced fuel vapor in the tank through a tank venting tube and into the conduit and then around the nozzle and out the mouth of the conduit to the atmosphere;

FIG. 10 is a view similar to FIG. 9 showing radially outward expansion of the ends of the nozzle fingers to accommodate a long-length nozzle (lower phantom lines) in addition to a standard-length nozzle (solid lines) and a short-length nozzle (upper horizontal phantom line);

DETAILED DESCRIPTION OF THE DRAWINGS

Figure 5:
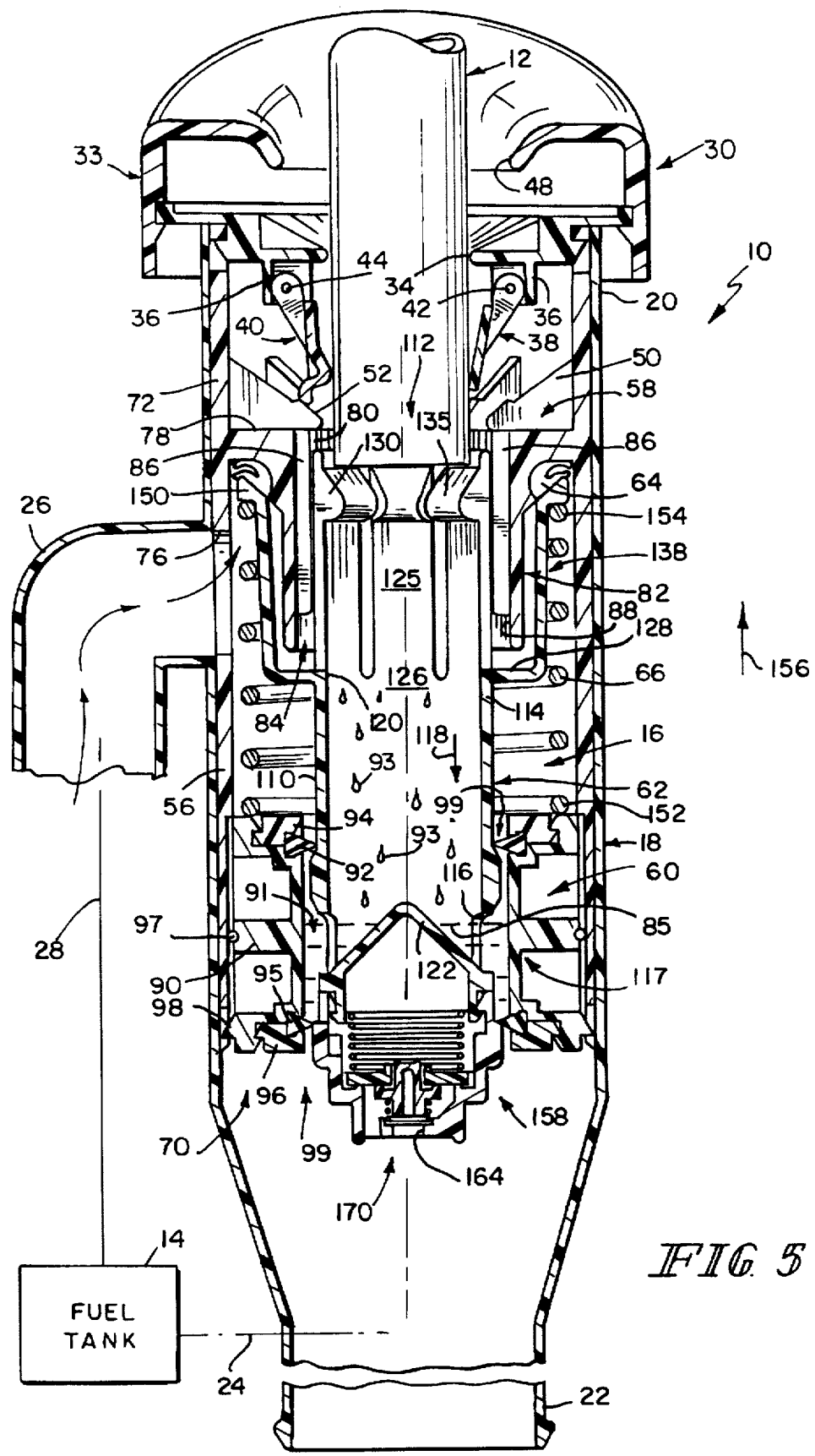
FIG. 5 is a view similar to FIG. 1 showing partial insertion of a fuel-dispensing nozzle into the filler neck and collection of liquid fuel leaking from the nozzle in a collection pool formed in a sealed chamber defined by the partition frame, the filler neck shuttle, and sealing rings mounted on the partition frame and arranged to engage the filler neck shuttle in its normal channel-closing position.

A filler neck 10 in accordance with the present invention is shown in section in FIG. 1 and is used to deliver liquid fuel from a fuel-dispensing nozzle 12 to a fuel tank 14. The filler neck 10 also includes an internal nozzle-actuated opening and closing mechanism 16 which operates to control flow of air, fuel vapor, and liquid fuel through filler neck 10 and eliminates the need for a conventional external filler neck closure cap.

The internal nozzle-actuated filler neck opening and closing mechanism 16 is configured to accept short-length, standard-length, and long-length fuel-dispensing nozzles that are inserted into filler neck 10 manually by a user and/or automatically by a robotic refueling system (not shown). The mechanism 16 also functions to vent pressurized fuel vapor from fuel tank 14 whenever the pressure extant in fuel tank 14 exceeds a predetermined positive pressure as may occur on a hot day. Outside air is admitted into fuel tank 14 by mechanism 16 whenever the pressure extant in fuel tank 14 exceeds a predetermined negative pressure to relieve vacuum conditions that may develop in fuel tank 14 during a cool evening or the like.

Filler neck 10 includes a conduit 18 having an outer end 20 that is arranged to receive fuel-dispensing nozzle 12 during refueling and an inner end 22 that is adapted to be coupled to a filler pipe 24 that conducts liquid fuel and fuel vapor between conduit 18 and fuel tank 14. A tank venting tube 26 is appended to conduit 18 and also coupled to a pipe 28 that is coupled to fuel tank 14 so as to conduct displaced fuel vapor from fuel tank 14 to conduit 18.

As shown in FIGS. 1 and 4, an appearance cover unit 30 is mounted on outer end 20 of conduit 30 to give the outward appearance that capless filler neck 10 is closed to provide comfort to consumers unable to see internal opening and closing mechanism 16. Appearance cover unit 30 also functions to keep unwanted dust and debris out of conduit 18 and admit only unleaded fuel-dispensing nozzles into conduit 18.

Appearance cover unit 30 includes a base 32 mounted on outer end 20 of conduit 18 and an appearance cover 33 mounted on base 32 as shown in FIG. 1. Base 32 is formed to include a central nozzle restrictor aperture 34 for receiving nozzle 12 and a pair of door supports 36 lying on opposite sides of central nozzle restrictor aperture 34. First and second closure doors 38, 40 are mounted on pivot shafts 42, 44 coupled to door supports 36 as shown in FIGS. 1 and 3. A torsion spring 46 around each pivot shaft 42, 44 biases its closure door 38 or 40 to maintain closure doors 38 40 in their normally closed positions as shown in FIGS. 1 and 3. Upon insertion of fuel-dispensing nozzle 12 into conduit 18 through an opening 48 formed in appearance cover 33, nozzle restrictor aperture 34 formed in base 32, and an open mouth formed in outer end 20 of conduit 18, closure doors 38 40 pivot to their opened positions opening nozzle restrictor aperture 34 as shown, for example, in FIG. 5.

As shown in FIG. 4, appearance cover 33 is a shell including an annular external side wall 49 and a funnel-shaped nozzle guide wall 51. The nozzle guide wall 51 is formed to include opening 48. Appearance cover 33 also includes one or more flanges 53 for engaging the underside of base 32 as shown, for example, in FIG. 1 to retain appearance cover 33 on base 32. In another embodiment (not shown), appearance cover 33 also includes an internal cylindrical standoff wall (not shown) aligned in concentric relation to annular external side wall 49 for engaging the topside of base 32 to support nozzle guide wall 51 above base 32.

As shown in FIGS. 1 and 4, internal nozzle-actuated opening and closing mechanism 16 includes a shuttle housing 56 configured to fit in conduit 18, a shuttle guide 58 inside shuttle housing 56, a partition unit 60 inside shuttle housing 56, a filler neck shuttle 62 positioned for movement inside shuttle housing 56, a top sealing ring 64 positioned to lie between shuttle guide 58 and filler neck shuttle 62, and a spring 66 acting between partition unit 60 and filler neck shuttle 62. Essentially, spring 66 normally biases the movable filler neck shuttle 62 to a filler neck-closing position as shown in FIG. 1 wherein an axially inner end of filler neck shuttle 62 is retained in sealed engagement with partition unit 60 and an axially outer end of filler neck shuttle 62 urges top sealing ring 64 in sealed engagement with shuttle guide 58. During refueling, a fuel-dispensing nozzle 12 inserted into filler neck 10 operates to move filler neck shuttle 62 in an axially inward direction 68 in conduit 18 relative to shuttle guide 58 and partition unit 60 so that sealed engagements therebetween are broken and filler neck shuttle 62 is moved to a filler neck-opening position as shown, for example, in FIG. 9. Filler neck shuttle 62 has a nozzle-receiving end that can flex or expand to allow passage of long-length fuel-dispensing nozzles 12 into shuttle 62 during refueling.

Shuttle housing 56 is made of a plastics material such as acetal or the like and may include a wear-resistant additive to increase life-shuttle housing 56 is sized to fit in a neck passageway to formed in conduit 18 as shown in FIG. 1. Shuttle housing 56 includes a cylindrical sleeve 72 formed to include an interior region 74 containing shuttle guide 58, partition unit 60, and filler neck shuttle 62. Cylindrical sleeve 72 is also formed to include a vent aperture 76 communicating with tank venting tube 26. Illustratively, shuttle guide 58 is integrally appended to an interior wall of cylindrical sleeve 72 and configured as shown in FIGS. 1 and 4 to include an annular transverse wall 78 formed to include an aperture 80, a tubular member 82 appended to the transverse wall 78 at the aperture 80 and configured to define a guide channel 84 receiving the filler neck shuttle 62 therein. A plurality of circumferentially spaced-apart, radially extending webs 50 are appended to cylindrical sleeve 72 and transverse wall 78, as shown in FIGS. 1 and 4. Each web 50 includes an inclined guide edge 52 oriented to guide fuel-dispensing nozzle 12 into aperture 80 during insertion of nozzle 12 into filler neck 10. A plurality of longitudinally extending deflection blocker ribs 86 are appended to a cylindrical interior wall 88 in tubular member 82 as shown in FIGS. 1 and 4 and configured to guide filler neck shuttle 62 as it reciprocates in and out between the filler neck-closing position shown in FIG. 1 and the filler neck-opening position shown in FIG. 9.

As shown in FIGS. 1 and 4, partition unit 60 is positioned in conduit 18 to divide neck passageway 70 into an outer chamber 87 communicating with the conduit mouth 132 and an inner chamber 89 communicating with an outlet formed in inner end 22 of conduit 18. Partition unit 60 includes a partition frame 90, an upper seal ring 92, an upper retaining ring 94 for trapping the upper seal ring 92 in a fixed position on the partition frame 90, a lower ring 95, and a lower retaining ring 96 for trapping the lower seal ring 95 in another fixed position on the partition frame 90 and in axially spaced-apart relation to the upper seal ring 92, and an outer seal ring 97. Outer seal ring 97 surrounds partition frame 90 and lies in an annular space between partition frame 90 and shuttle housing 56 to establish a liquid and vapor seal therebetween. Upper seal ring 92 and outer seal ring 97 function as two tank venting tube seals. These two seals 92, 97 can be removed if filler neck 10 is used in conjunction with an Onboard Refueling Vapor Recovery (ORVR) system (not shown).

Partition frame 90 is made of a plastics material such as acetal copolymer or the like and is sized to mount in a fixed position in the innermost end of shuttle housing 56 as shown, for example, in FIG. 1 using mounting flanges 98 or other suitable mounting means. Partition frame 90 is also formed to include a partition channel 99 for receiving the moving filler neck shuttle 62 therein. Partition channel 99 is aligned with the overlying guide channel 84 so that filler neck shuttle 62 can extend into both channels 99, 84 simultaneously as it reciprocates in and out between its filler neck-closing position and filler neck-opening position. As shown in FIG. 1, the upper and lower seal rings 92, 95 are positioned to extend into the partition channel 99 so that the rings 92, 95 seal against perimeter portions of the filler neck shuttle 62 to establish sealing engagement therewith in certain positions of the shuttle 62 relative to the partition unit 60.

As shown in FIGS. 1 and 4, filler neck shuttle 62 includes a fill tube 110, a plurality of upstanding nozzle fingers 112 appended to an outer end 114 of fill tube 110, and a fuel-discharging outlet 116 formed in a side wall at an inner end 117 of fill tube 110. Fill tube 110 is formed to include a fill passageway 118 having an inlet 120 near nozzle fingers 112 and conducting liquid and fuel from a fuel-dispensing nozzle 12 inserted into shuttle 62 to fuel-discharging outlet 116. A raised conical bottom wall 122 is provided in fill passageway 118 near outlet 116 to provide means for directing liquid fuel discharged from nozzle 12 into fill passageway 118 out of filler neck shuttle 62 through fuel-discharging outlet 116.

As shown in FIGS. 1 and 5, partition frame 90, upper and lower seal rings 92, 95, and filler neck shuttle 62 cooperate to define a sealed chamber 91 for receiving liquid fuel 93 (FIG. 5) from fill passageway 118 formed in fill tube 110 through fuel-discharging outlet 116 when filler neck shuttle 62 lies in its filler neck-closing position. Any pool 85 of liquid fuel 93 collecting in sealed chamber 91 as shown in FIG. 5 will be discharged to fuel tank 14 through conduit outlet 22 and filler pipe 24 when filler neck shuttle 62 is moved toward its filler neck-opening position and breaks sealing contact with lower seal ring 95 mounted on partition frame 90, as shown, for example, in FIG. 6.

As shown in FIGS. 1 and 4, a plurality of upstanding nozzle fingers 112 are appended to outer end 114 of fill tube 110 and arranged to define a nozzle-receiving inlet 124 in filler neck shuttle 62. Each nozzle finger 112 includes a blade 125 having an inner end 126 cantilevered to an annular top edge 128 of outer end 124 and a free end 130. The upstanding nozzle fingers 112 are arranged to lie in circumferentially spaced-apart relation one to another along annular top edge 128 of fill tube 110 and to project upwardly toward mouth 132 of conduit 18. A drive lug 134 having an upwardly facing inclined ramp 135 is arranged on the free end 130 of each blade 125 to project away from the free end 130 in a radially inwardly extending direction toward the longitudinal axis 136 of filler neck shuttle 62. The inclined ramps 135 of all the drive lugs 134 are arranged as shown in FIG. 4 to define a "funnel guide" for guiding nozzle 12 into filler neck shuttle 62 during insertion of nozzle 12 into filler neck 10 as shown, for example, in FIGS. 7 and 9.

Filler neck shuttle 62 also includes a closure cup 138 formed to include an interior region 140, a top opening 142, and a bottom opening 144. Fill tube 110 is appended to closure cup 138 at bottom opening 144 as shown in FIG. 1 to position upstanding nozzle fingers 112 in interior region 114 of closure cup 138. Closure cup 138 includes a bottom wall 146 formed to include bottom opening 144, an annular somewhat conical side wall 148, and an annular flange 150 along the top edge of conical side wall 148. Annular flange 150 is illustratively a circular member positioned to lie in spaced-apart and coaxial relation to the overlying circular transverse wall 78 included in shuttle guide 58.

Spring 66 is a coiled compression spring formed to "wind" around movable filler neck shuttle 62. An inner end 152 of spring 66 abuts partition frame 90 and an outer end 154 of spring 66 abuts annular flange 150 on closure cup 138 of filler neck shuttle 62. Spring 66 functions to yieldably urge filler neck shuttle 62 outwardly in direction 156 as shown in FIG. 1 in neck passageway 70 toward the mouth 132 of conduit 18 to place filler neck shuttle 62 normally in its filler neck-closing position. In this position, spring 66 urges annular flange 150 toward transverse wall 78 to trap top sealing ring 64 therebetween as shown in FIG. 1 to establish a sealed connection between filler neck shuttle 62 and shuttle guide 58 when filler neck shuttle 62 occupies its filler neck-closing position.

The internal opening and closing mechanism 16 also includes a vent valve assembly 158 appended to the fill tube 110 to move therewith. Vent valve assembly 158 operates to control air and fuel (liquid and vapor) flow between fill passageway 18 formed in shuttle 62 and the inner chamber 89 in the conduit 18 upon movement of the filler neck shuttle 62 to the filler neck-closing position. Vent valve assembly 158 is appended to the bottom wall 160 of fill tube 110 in a position underlying fuel-discharging outlet 116 in fill tube 110 as shown in FIGS. 1 and 4.

Figure 11:
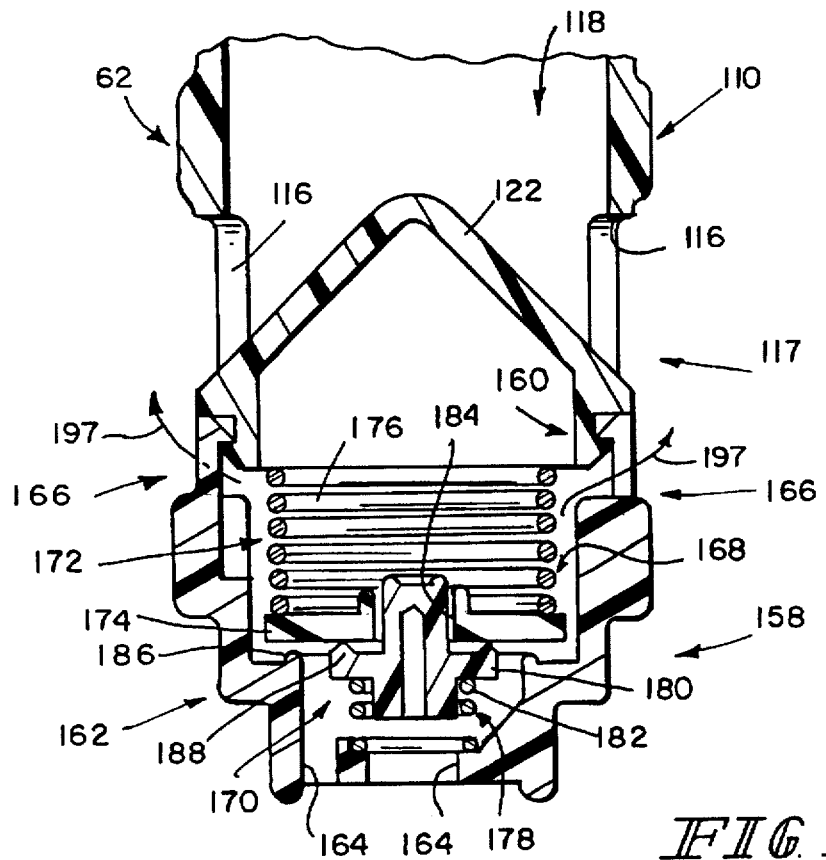
FIG. 11 is an enlarged view of the vent valve assembly appended to the filler neck shuttle of FIG. 10 showing operation of a pressure-relief valve mechanism.

Referring to FIGS. 1 and 11, vent valve assembly 158 includes a valve body 162 formed to include a first vent opening 164 communicating with inner chamber 89 in conduit 18 and a second vent opening 166 positioned to lie in partition channel 99 upon movement of shuttle 62 to the filler neck-closing position (FIG. 1). Valve body 162 also includes an interior region 168 interconnecting the first and second vent openings 164, 166.

A valve mechanism 170 is positioned in the interior region 168 of valve body 162 to control air and fuel (liquid and vapor) flow through the interior region 168 and between the fill passageway 118 formed in fill tube 110 and the inner chamber 89 formed in conduit 18. Valve mechanism 170 includes a pressure-relief valve 172 comprising a valve plate 174 and spring 176 and a vacuum-relief valve 178 comprising a valve plate 180, a guide stem 181, and spring 182. Valve plate 174 is formed to include a vacuum-vent aperture 184 and is normally biased by spring 176 to engage and seal against an annular valve seat 186 formed on valve body 162 and arranged to lie in interior region 168. Guide stem 181 of vacuum-relief valve 178 passes through vacuum-vent aperture 184 and valve plate 180 carries an annular valve rim 188 that is normally biased by spring 182 to engage and seal against the underside of valve plate 174.

Prior to refueling, filler neck 10 is normally in a closed configuration as shown in FIG. 1. Fuel-dispensing nozzle 12 has not yet been inserted into the neck passageway 70 formed in conduit 18 through openings 48, 34 formed in appearance cover unit 30. At this stage, spring 66 has urged filler neck shuttle 62 to a position engaging seal rings 92, 95 and closing partition channel 99 formed in partition frame 90. Annular flange 150 on closure cup 138 is biased to urge top seal ring 64 against transverse wall 78 and establish a sealed connection between filler neck shuttle 62 and shuttle guide 58. In this filler neck-closing position of shuttle 62, vent valve assembly 158 can operate automatically to regulate air, liquid fuel, and fuel vapor flow between inner chamber 89 in conduit 18 and sealed chamber 91 outside of shuttle 62 and in partition channel 99 so that such flow can take place between filler tube 24 and fill passage 118 in fill tube 110 which communicates with the mouth 132 of conduit 18.

Referring now to FIG. 5, it will be seen that fuel-dispensing nozzle 112 is passed through the openings 48, 34 formed in appearance cover unit 30 to pivot the spring-loaded closure doors 38, 40 to their opened positions during insertion of nozzle 12 into filler neck 10. Occasionally, a small amount of liquid fuel extant in the tip of nozzle 12 will leak out of nozzle 12 during insertion of nozzle 12 into a filler neck. Filler neck 10 is configured to first collect such leaking fuel in chamber 91 and later discharge it to fuel tank 14. As shown in FIG. 5, fuel droplets 93 leaking from fuel-dispensing nozzle 12 will fall through fill passageway 118 onto conical bottom wall 122 and be guided through fill-discharging outlet 116 into sealed chamber 91. As noted previously, sealed chamber 91 is located in partition channel 99 between partition frame 90 and filler neck shuttle 62. A pool 85 of liquid fuel 93 will collect in sealed chamber 91 as shown in FIG. 5 and then be discharged from sealed chamber 91 once filler neck shuttle 62 moves inwardly to break sealing contact with inner seal ring 95 as shown in FIG. 6. It will be understood that a pool 85 of liquid fuel 93 could be collected in chamber 91 without using upper seal ring 92.

Fuel-dispensing nozzle 12 engages inclined ramps 135 provided on the drive lugs 134 appended to the blades 125 included in nozzle fingers 112 as soon as nozzle 12 passes into guide channel 84 formed in shuttle guide 58. The longitudinally extending deflection blocker ribs 86 situated in guide channel 84 provide means for blocking radial deflection of the free ends 130 of the nozzle finger blades 125 away from longitudinal axis 136 of filler neck shuttle 62 during initial movement of shuttle 62 from its channel-closing position shown in FIG. 1 toward its channel-opening position shown in FIG. 7. As shown in FIG. 6, deflection blocker ribs 86 guide blades 25 as shuttle 62 moves in neck passageway 70 and also block radially outward movement of blades 125 to define and maintain a fixed internal diameter of a nozzle-receiving inlet defined by the free ends 130 of blades 125.

The constraint against radially outward movement of the free ends 130 of nozzle finger blades 125 is "loosened" somewhat as soon as shuttle 62 reaches the position shown in FIG. 7. At this stage, the free ends 130 of the nozzle finger blades 125 have disengaged the deflection blocker ribs 86 situated in the guide channel 84. Continued inward movement of nozzle 12 against the inclined ramps 135 on the nozzle finger drive lugs 134 will cause some radially outward movement of the free ends 130 of nozzle finger blades 125 into an annular blade-receiving channel 192 defined by cylindrical interior wall 88 of tubular member 82. The configuration of ribs 86 and wall 88 cooperate to allow radial deflection of the free ends 130 of the nozzle finger blades 125 away from longitudinal axis 136 of filler neck shuttle 62 upon movement of shuttle 62 to a channel-opening position. Such movement increases the effective internal diameter of the nozzle-receiving inlet in the filler neck shuttle 62 so that the drive lugs 134 appended to the free ends 130 of the blades 125 move away from longitudinal axis 136 to disengage from a tip of nozzle 12 upon movement of shuttle 62 to a position opening partition channel 99. As noted below this "internal diameter-increasing" feature of shuttle 62 helps to accommodate long-length nozzles in filler neck 10. In other words, nozzle fingers 12 are flexed to bend away from longitudinal axis 136 during insertion of nozzle 12 into fill tube to allow for deeper penetration of nozzle 12 into fill passageway 118 formed in fill tube 110.

Once nozzle 12 has been fully inserted into filler neck 10, nozzle 12 can be operated manually and/or automatically to dispense liquid fuel 194 into fill passageway 118 in fill tube 110 of shuttle 62. This dispensed liquid fuel 194 passes along conical bottom wall 122 and out of fill passageway 118 and into inner chamber 89 in conduit 18 through fuel-discharging outlet 116 formed in a side wall of fill tube 110. The liquid fuel 194 then passes on to fuel tank 14 through filler pipe 24. It will be seen that liquid fuel 194 dispensed into filler neck 10 does not pass through vent valve assembly 158 on its way to fuel tank 14. At the same time displaced tank fuel vapors 196 discharged from fuel tank 14 by a valve assembly (not shown) during refueling pass through pipe 28, tank venting tube 26, venting aperture 76, blade-receiving channel 192, guide channel 84, nozzle restrictor aperture 34, and appearance cover opening 48 to the atmosphere. It is within the scope of the present invention to discharge these displaced fuel vapors to an Onboard Refueling Vapor Recovery (ORVR) system (not shown).

As seen in FIG. 10, filler neck 10 is configured to receive standard-length nozzles 12, short-length nozzles 12a (upper phantom lines), and long-length nozzles 12b (lower phantom lines). Once the filler neck shuttle 62 has been moved by nozzle 12 to cause the bottom wall 146 of closure cup 138 to "bottom out" on upper retaining ring 94 as shown in FIG. 10, there is still ample space inside fill passageway 118 of fill tube 110 to receive even a longlength fuel-dispensing nozzle 12b without disrupting discharge of liquid fuel from the nozzle 12b during refueling.

Figure 12:
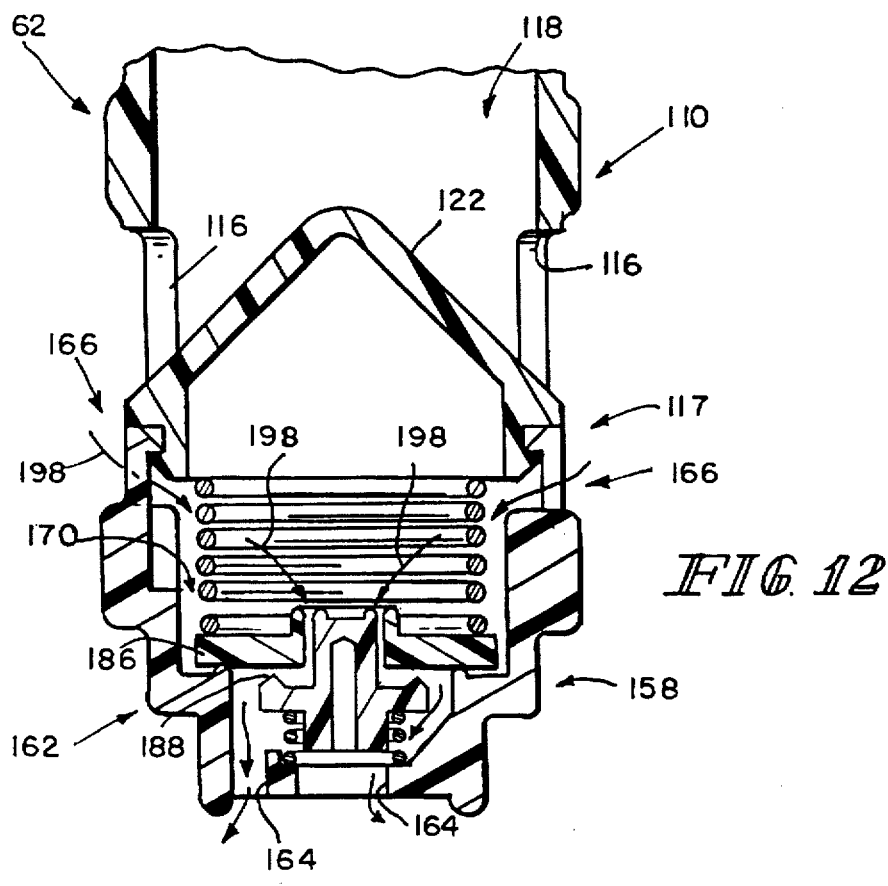
FIG. 12 is a view similar to FIG. 11 showing operation of a vacuum-relief valve mechanism.

Operation of vent valve assembly 158 is shown in FIGS. 11 and 12. Pressurized fuel vapor 197 is vented from inner chamber 89 in conduit 18 through second vent opening 166 in valve body 162 due to opening of pressure-relief valve 172 as shown in FIG. 11. Ambient air 198 is admitted in to inner chamber 89 in conduit 18 through first and second vent openings 164, 166 and interior region 168 in valve body 162 due to opening of vacuum-relief valve 178 as shown in FIG. 12.

Filler neck 10 is designed to eliminate the need to remove and reinstall a conventional cap during a refueling operation. Filler neck 10 is configured to operate in series with a vented or ORVR system and to provide for positive and/or negative fuel tank pressure relief. Filler neck 10 is believed to be compatible with all standard as well as active and passive vapor recovery refueling nozzles and with automatic refueling systems.

Filler neck shuttle 62 and spring 66 do not push nozzle 12 out of filler neck 10 when fully installed because all forces applied to nozzle 12 are perpendicular to longitudinal axis 136. Shuttle 62 only has to move far enough along longitudinal axis 136 to expose fuel-discharging outlet 116 in fill tube 110 to inner chamber 89 in conduit 18. This feature will allow unleaded fuel-dispensing nozzles 12a of short length (i.e., nozzle latch point to tip of nozzle) to activate shuttle 62 in a manner identical to long-length nozzle 12b. Shuttle 62 will react in this manner with all "unleaded" nozzles. This also minimizes the stroke length of shuttle 62 and spring 66 and reduces the overall length of the closure unit.

The vent seal 97 (on vented systems as shown) will "open" before the tank seal 95. This will force all puff loss vapors to be directed past the vent seal 97. Residual liquid 93 that drains out of nozzle 12 will be on "top" of the vent seal 97 in a location away from the path of the puff loss fuel vapors. Vacuum-relief valve 178 can also serve as a drain back valve for residual liquid.

Although, the invention has been described in detail with reference to preferred embodiments, variations and modifications exist within the scope and spirit of the invention as described and defined in the following claims.

I claim:

1. A filler neck for use in delivering fuel to a vehicle fuel tank, the filler neck comprising
   a conduit including an outer end formed to include a mouth, an inner end formed to include a conduit outlet adapted to be coupled to a fuel tank inlet, and a neck passageway extending between the mouth and the conduit outlet,
   a partition unit positioned in the conduit to divide the neck passageway into an outer chamber communicating with the mouth and an inner chamber communicating with the conduit outlet, the partition unit being formed to include a partition channel extending therethrough and interconnecting the outer and inner chambers, the partition channel having a first lateral width adjacent the a lower end of the partition unit,
   a filler neck shuttle positioned for movement in the neck passageway and the partition channel between a channel-opening position and a channel-closing position, the filler neck shuttle being formed to include a nozzle-receiving inlet positioned to face toward the mouth of the conduit, a fuel-discharging outlet positioned to communicate with the inner chamber upon movement of the filler neck shuttle to the channel-opening position, and a fill passageway extending between the nozzle-receiving inlet and the fuel-discharging outlet, the fill passageway having a second lateral width situated between the nozzle-receiving inlet and the fuel-discharging outlet, the second lateral width being less than the first lateral width, and
   a spring yieldably urging the filler neck shuttle in the neck passageway toward the mouth of the conduit and into engagement with the partition unit to place the filler neck shuttle in the channel-closing position to block flow of liquid fuel and fuel vapor extant in the fill passageway formed in the filler neck shuttle into the inner chamber formed in the conduit.

2. The filler neck of claim 1, wherein the filler neck shuttle includes a tube formed to include the fill passageway and a plurality of upstanding nozzle fingers appended to one end of the tube and arranged to define the nozzle-receiving inlet.

3. The filler neck of claim 2, wherein the filler neck shuttle further includes a closure cup formed to include an interior region, a top opening, and a bottom opening, the tube is appended to the closure cup at the bottom opening to position the upstanding nozzle fingers in the interior region of the closure cup, and the spring engages the closure cup to yieldably urge the filler neck shuttle to the channel-closing position.

4. The filler neck of claim 3, wherein the conduit further includes a shuttle guide positioned to lie in the neck passageway and a seal ring abutting the shuttle guide, the shuttle guide is formed to include a guide channel receiving the upstanding nozzle fingers therein, the conduit, shuttle guide, filler neck shuttle, and partition unit cooperate to define a vent region in the conduit, the closure cup includes an annular flange positioned to confront the seal ring, and the spring engages the annular flange to urge the annular flange toward the shuttle guide to trap the seal ring therebetween upon movement of the filler neck shuttle to the channel-closing position to block flow of fuel vapor from the vent through the guide channel formed in the shuttle guide.

5. The filler neck of claim 4, wherein the conduit further includes means for receiving fuel vapor vented from a fuel tank in the vent region defined in the conduit.

6. The filler neck of claim 1, wherein the filler neck shuttle includes a fill tube formed to include the fill passageway and a vent valve assembly appended to the fill tube to move therewith relative to the partition unit.

7. The filler neck of claim 1, wherein the fuel-discharging outlet of the filler neck shuttle is formed for extension through the partition channel and into the inner chamber.

8. The filler neck of claim 7, wherein the filler neck shuttle includes a side wall extending from the nozzle-receiving inlet toward the inner chamber and the fuel-discharging outlet is formed to extend through the side wall.

9. The filler neck of claim 8, wherein the fuel-discharging outlet is configured to discharge fuel in a radially outward direction.

10. The filler neck of claim 1, wherein the partition unit further comprises a seal formed for extension into the partition channel.

11. The filler neck of claim 10, wherein the partition unit further comprises spaced-apart upper and lower seals formed for extension into the partition channel.

12. A filler neck for use in delivering fuel to a vehicle fuel tank, the filler neck comprising
   a conduit including an outer end formed to include a mouth, an inner end formed to include a conduit outlet adapted to be coupled to a fuel tank inlet, and a neck passageway extending between the mouth and the conduit outlet,
   a partition unit positioned in the conduit to divide the neck passageway into an outer chamber communicating with the mouth and an inner chamber communicating with the conduit outlet, the partition unit being formed to include a partition channel extending therethrough and interconnecting the outer and inner chambers, a filler neck shuttle positioned for movement in the neck passageway and the partition channel between a channel-opening position and a channel-closing position, the filler neck shuttle being a nozzle formed to include a nozzle-receiving inlet positioned to face toward the mouth of the conduit, a fuel-discharging outlet positioned to communicate with the inner chamber upon movement of the filler neck shuttle to the channel-opening position, a tube including an annular top edge and a fill passageway extending between the nozzle-receiving inlet and the fuel-discharging outlet, and a plurality of upstanding nozzle fingers each including an inner end cantilevered to the annular top edge and a free end, and the upstanding nozzle fingers being arranged to lie in circumferentially spaced-apart relation along the annular top edge of the tube to project toward the mouth of the conduit and to define the nozzle-receiving inlet, a spring yieldably urging the filler neck shuttle in the neck passageway toward the mouth of the conduit and into engagement with the partition unit to place the filler neck shuttle in the channel-closing position to block flow of liquid fuel and fuel vapor extant in the fill passageway formed in the filler neck shuttle into the inner chamber formed in the conduit.

13. The filler neck of claim 12, wherein the filler neck shuttle includes a longitudinal axis extending through the fill passage and the conduit includes a shuttle guide positioned to lie in the neck passageway and formed to include means for blocking radial movement of the free ends of the nozzle fingers away from the longitudinal axis while the filler neck shuttle is in the channel-closing position and allowing radial movement of the free ends of the nozzle fingers away from the longitudinal axis during movement of the filler neck shuttle toward the channel-closing position.

14. A filler neck for use in delivering fuel to a vehicle fuel tank, the filler neck comprising a conduit including an outer end formed to include a mouth, an inner end formed to include a conduit outlet adapted to be coupled to a fuel tank inlet, and a neck passageway extending between the mouth and the conduit outlet, a partition unit positioned in the conduit to divide the neck passageway into an outer chamber communicating with the mouth and an inner chamber communicating with the conduit outlet, the partition unit being formed to include a partition channel extending therethrough and interconnecting the outer and inner chambers, a filler neck shuttle positioned for movement in the neck passageway and the partition channel between a channel-opening position and a channel-closing position, the filler neck shuttle being formed to include a nozzle-receiving inlet positioned to face toward the mouth of the conduit, a fuel-discharging outlet positioned to communicate with the inner chamber upon movement of the filler neck shuttle to the channel-opening position, a tube including a fill passageway extending between the nozzle-receiving inlet and the fuel-discharging outlet, a plurality of upstanding nozzle fingers appended to one end of the tube and arranged to define the nozzle-receiving inlet, at least one of the upstanding nozzle fingers including a blade having an inner end cantilevered to the tube and a free end positioned to lie in spaced-apart relation to the tube and in confronting relation to the mouth of the conduit and a drive lug appended to the free end of the blade and arranged to engage a fuel-dispensing nozzle inserted into the mouth of the conduit during movement of the filler neck shuttle from its channel-opening position to its channel-closing position, and a spring yieldably urging the filler neck shuttle in the neck passageway toward the mouth of the conduit and into engagement with the partition unit to place the filler neck shuttle in the channel-closing position to block flow of liquid fuel and fuel vapor extant in the fill passageway formed in the filler neck shuttle into the inner chamber formed in the conduit.

15. The filler neck of claim 14, wherein the filler neck shuttle includes a longitudinal axis extending through the fill passage and the drive lug is arranged on the free end of the blade to project away from said free end in a radially inwardly extending direction toward the longitudinal axis of the filler neck shuttle.

16. The filler neck of claim 14, wherein the drive lug includes an inclined ramp positioned to face toward the mouth of the conduit and engage a fuel-dispensing nozzle inserted into the mouth of the conduit.

17. The filler neck of claim 14, wherein the filler neck shuttle includes a longitudinal axis extending through the fill passage, the conduit further includes a shuttle guide positioned to lie in the neck passageway and formed to include a guide channel receiving the filler neck shuttle therein, the shuttle guide includes means in the guide channel for blocking radial deflection of the free end of at least one of the blades away from the longitudinal axis of the filler neck shuttle during movement of the filler neck shuttle from the channel-closing position toward the channel-opening position to define an internal diameter of the nozzle-receiving inlet and allowing radial deflection of the free ends of said at least one of the blades away from the longitudinal axis of the filler neck shuttle upon movement of the filler neck shuttle to the channel-opening position to increase the internal diameter of the nozzle-receiving inlet in the filler neck shuttle so that the drive lugs appended to the free ends of the blades move away from the longitudinal axis of the filler neck shuttle to disengage from a tip of a fuel-dispensing nozzle inserted into the nozzle-receiving inlet upon movement of the filler neck shuttle to the channel-opening position.

18. The filler neck of claim 14, wherein the filler neck includes a longitudinal axis extending through the fill passage, the conduit further includes a shuttle guide positioned to lie in the neck passageway and formed to include a guide channel receiving the filler neck shuttle therein, the shuttle guide including an inner wall defining the guide channel and a plurality of longitudinally extending deflection blocker ribs appended to the inner wall and arranged to project into the guide channel and engage the blades of the upstanding nozzle fingers during movement of the filler neck shuttle toward the channel-opening position, and the inner wall of the shuttle guide is formed to include a blade-receiving channel underlying the deflection blocker ribs and receiving the free ends of the blades upon disengagement of the blades and the deflection blocker ribs during movement of the filler neck shuttle to the channel-opening position.

19. A filler neck for use in delivering fuel to a vehicle fuel tank, the filler neck comprising a conduit including an outer end formed to include a mouth, an inner end formed to include a conduit outlet adapted to be coupled to a fuel tank inlet, a neck passageway extending between the mouth and the conduit outlet, a shuttle guide positioned to lie in the neck passageway and a seal ring abutting the shuttle guide, the shuttle guide being formed to include a guide channel, a partition unit positioned in the conduit to divide the neck passageway into an outer chamber communicating with the mouth and an inner chamber communicating with the conduit outlet, the partition unit being formed to include a partition channel extending therethrough and interconnecting the outer and inner chambers, a filler neck shuttle positioned for movement in the neck passageway and the partition channel between a channel-opening position and a channel-closing position, the filler neck shuttle being formed to include a nozzle-receiving inlet positioned to face toward the mouth of the conduit, a fuel-discharging outlet positioned to communicate with the inner chamber upon movement of the filler neck shuttle to the channel-opening position, a tube formed to include a fill passageway extending between the nozzle-receiving inlet and the fuel-discharging outlet, a plurality of upstanding nozzle fingers appended to one end of the tube and arranged to define the nozzle-receiving inlet, and a closure cup formed to include an interior region, a top opening, a bottom opening, and an annular flange positioned to confront the seal ring, the tube is appended to the closure cup at the bottom opening to position the upstanding nozzle fingers in the interior region of the closure cup, and the conduit, shuttle guide, filler neck shuttle, and partition unit cooperate to define a vent region in the conduit, and a spring yieldably urging the filler neck shuttle in the neck passageway toward the mouth of the conduit and into engagement with the partition unit to place the filler neck shuttle in the channel-closing position to block flow of liquid fuel and fuel vapor extant in the fill passageway formed in the filler neck shuttle into the inner chamber formed in the conduit, the spring engages the annular flange of the closure cup to yieldably urge the filler neck shuttle to the channel-closing position and to urge the annular flange toward the shuttle guide to trap the seal ring therebetween upon movement of the filler neck shuttle to the channel-closing position to block flow of fuel vapor from the vent region formed in the conduit to the mouth of the conduit through the guide channel formed in the shuttle guide, and wherein the shuttle guide further includes an annular wall engaging the seal ring, a tube appended to the annular wall and arranged to project toward the partition unit, the tube is formed to include an inner wall defining the guide channel receiving the upstanding nozzle fingers therein, and a plurality of longitudinally extending deflection blocker ribs appended to the inner wall and arranged to engage the upstanding nozzle fingers until the filler neck shuttle is moved in the conduit to reach the channel-opening position.

20. A filler neck for use in delivering fuel to a vehicle fuel tank, the filler neck comprising a conduit including an outer end formed to include a mouth, an inner end formed to include a conduit outlet adapted to be coupled to a fuel tank inlet, and a neck passageway extending between the mouth and the conduit outlet, a partition unit positioned in the conduit to divide the neck passageway into an outer chamber communicating with the mouth and an inner chamber communicating with the conduit outlet, the partition unit being formed to include a partition channel extending therethrough and interconnecting the outer and inner chambers and a frame formed to include the partition channel and a first seal ring mounted on the frame, a filler neck shuttle positioned for movement in the neck passageway and the partition channel between a channel-opening position and a channel-closing position, the filler neck shuttle being formed to include a nozzle-receiving inlet positioned to face toward the mouth of the conduit, a fuel-discharging outlet positioned to communicate with the inner chamber upon movement of the filler neck shuttle to the channel-opening position, and a fill passageway extending between the nozzle-receiving inlet and the fuel-discharging outlet, a spring yieldably urging the filler neck shuttle in the neck passageway toward the mouth of the conduit and into engagement with the partition unit to place the filler neck shuttle in the channel-closing position to block flow of liquid fuel and fuel vapor extant in the fill passageway formed in the filler neck shuttle into the inner chamber formed in the conduit, and wherein the first seal ring is formed to engage the filler neck shuttle in the channel-closing position to block liquid and vapor flow between the fill passageway formed in the filler neck shuttle and the inner chamber formed in the conduit.

21. The filler neck of claim 20, wherein the filler neck shuttle includes a side wall formed to include the fuel-discharging outlet, the partition unit includes a second seal ring positioned to lie in axially spaced-apart relation to the first seal and mounted on the frame to engage the filler neck shuttle in the channel-closing position, and the frame, first seal ring, second seal ring, and filler neck shuttle cooperate to define a sealed chamber receiving liquid fuel extant in the fill passageway through the fuel-discharging outlet formed in the filler neck shuttle while the filler neck shuttle remains in the channel-closing position and discharging said liquid fuel into the inner chamber formed in the conduit during movement of the filler neck shuttle toward the channel-opening position.

22. The filler neck of claim 21, wherein the filler neck shuttle further includes means in the fill passageway for directing liquid fuel discharged from a fuel-dispensing nozzle inserted into the fill passageway into the sealed chamber through the fuel-discharging outlet.

23. The filler neck of claim 21, wherein the filler neck shuttle further includes a valve body formed to include a vent passageway having an outlet communicating with the sealed chamber upon movement of the filler neck shuttle to the channel-closing position and an inlet communicating with the inner chamber formed in the conduit and at least one vent valve assembly in the vent passageway formed in the valve body.

24. The filler neck of claim 20, wherein the filler neck shuttle includes pressure-relief means for venting pressurized fuel vapor from the inner chamber formed in the conduit to the fill passageway for discharge from the filler neck while the filler neck shuttle remains in the channel-closing position and in engagement with the first seal ring mounted on the frame so that excess fuel vapor extant in the inner chamber formed in the conduit is dissipated.

25. The filler neck of claim 20, wherein the filler neck shuttle includes vacuum-relief means for admitting ambient air extant in the fill passageway into the inner chamber formed in the conduit when the pressure in the inner chamber exceeds a predetermined negative pressure and while the filler neck shuttle remains in the channel-closing position and in engagement with the first seal ring mounted on the frame so that unwanted vacuum in the inner chamber is dissipated.

26. A filler neck for use in delivering fuel to a vehicle fuel tank, the filler neck comprising
 a conduit including an outer end formed to include a mouth, an inner end formed to include a conduit outlet adapted to be coupled to a fuel tank inlet, and a neck passageway extending between the mouth and the conduit outlet,
 a partition unit positioned in the conduit to divide the neck passageway into an outer chamber communicating with the mouth and an inner chamber communicating with the conduit outlet, the partition unit being formed to include a partition channel extending therethrough and interconnecting the outer and inner chambers,
 a filler neck shuttle positioned for movement in the neck passageway and the partition channel between a channel-opening position and a channel-closing position, the filler neck shuttle being formed to include a nozzle-receiving inlet positioned to face toward the mouth of the conduit, a fuel-discharging outlet positioned to communicate with the inner chamber upon movement of the filler neck shuttle to the channel-opening position, a fill tube formed to include a fill passageway extending between the nozzle-receiving inlet and the fuel-discharging outlet, a vent valve assembly appended to the fill tube to move therewith relative to the partition unit, and a side wall defining the fill passageway and a bottom wall appended to the side wall and arranged to lie in spaced-apart relation to the nozzle-receiving inlet, the vent valve assembly being appended to the bottom wall and arranged to underlie the fill tube, and
 a spring yieldably urging the filler neck shuttle in the neck passageway toward the mouth of the conduit and into engagement with the partition unit to place the filler neck shuttle in the channel-closing position to block flow of liquid fuel and fuel vapor extant in the fill passageway formed in the filler neck shuttle into the inner chamber formed in the conduit.

27. The filler neck of claim 26, wherein the side wall is formed to include the fuel-discharging outlet and to position the fuel-discharging outlet to lie in the partition channel upon movement of the filler neck shuttle to the channel-closing position and the partition unit includes a frame defining the partition channel and a sealing ring coupled to the frame and arranged to engage the filler neck shuttle to establish a liquid fuel and fuel vapor seal therebetween upon movement of the filler neck shuttle to the channel-closing position.

28. The filler neck of claim 26, wherein the vent valve assembly includes a valve body formed to include a first vent opening communicating with the inner chamber, a second vent opening positioned to lie in the partition channel upon movement of the filler neck shuttle to the channel-closing position, and an interior region interconnecting the first and second vent openings, and a valve mechanism positioned in the interior region of the valve body to control air and fuel flow through the interior region and between the fill passageway formed in the fill tube and the inner chamber formed in the conduit.

29. The filler neck of claim 28, wherein the valve mechanism includes a pressure-relief valve.

30. The filler neck of claim 29, wherein the valve mechanism also includes a vacuum-relief valve.

31. The filler neck of claim 28, wherein the valve mechanism includes a vacuum-relief valve.

32. A filler neck for use in delivering fuel to a vehicle fuel tank, the filler neck comprising
 a conduit including an outer end formed to include a mouth, an inner end formed to include a conduit outlet adapted to be coupled to a fuel tank inlet, and a neck passageway extending between the mouth and the conduit outlet,
 a partition unit positioned in the conduit to divide the neck passageway into an outer chamber communicating with the mouth and an inner chamber communicating with the conduit outlet, the partition unit being formed to include a partition channel extending therethrough and interconnecting the outer and inner chambers,
 a filler neck shuttle positioned for movement in the neck passageway and the partition channel between a channel-opening position and a channel-closing position, the filler neck shuttle being formed to include a nozzle-receiving inlet positioned to face toward the mouth of the conduit, a fuel-discharging outlet positioned to communicate with the inner chamber upon movement of the filler neck shuttle to the channel-opening position, and a fill passageway extending between the nozzle-receiving inlet and the fuel-discharging outlet, and
 a vent valve assembly appended to the filler neck shuttle to move therewith, the vent valve assembly including means for controlling air and fuel flow between the fill passageway formed in the filler neck shuttle and the inner chamber formed in the conduit upon movement of the filler neck shuttle to the channel-closing position.

33. The filler neck of claim 32, wherein the filler neck shuttle includes a side wall defining the fill passageway and a bottom wall appended to the side wall and arranged to lie in spaced-apart relation to the nozzle-receiving inlet and the vent valve assembly is appended to the bottom wall and arranged to underlie the fill tube.

34. The filler neck of claim 33, wherein the side wall is formed to include the fuel-discharging outlet and to position the fuel-discharging outlet to lie in the partition channel upon movement of the filler neck shuttle to the channel-closing position and the partition unit includes a frame defining the partition channel and a sealing ring coupled to the frame and arranged to engage the filler neck shuttle to establish a liquid fuel and fuel vapor seal therebetween upon movement of the filler neck shuttle to the channel-closing position.

35. The filler neck of claim 33, wherein the vent valve assembly includes a valve body formed to include a first vent opening communicating with the inner chamber, a second vent opening positioned to lie in the partition channel upon movement of the filler neck shuttle to the channel-closing position, and an interior region interconnecting the first and second vent openings, and a valve mechanism positioned in the interior region of the valve body to control air and fuel flow through the interior region and between the fill passageway formed in the fill tube and the inner chamber formed in the conduit.

36. The filler neck of claim 35, wherein the valve mechanism includes a pressure-relief valve.

37. The filler neck of claim 36, wherein the valve mechanism also includes a vacuum-relief valve.

38. The filler neck of claim 35, wherein the valve mechanism includes a vacuum-relief valve.

39. The filler neck of claim 33, wherein the side wall defines a cylindrical fill tube containing the fill passageway and the tube includes a plurality of upstanding nozzle fingers appended to one end of the cylindrical fill tube and arranged to define the nozzle-receiving inlet.

40. The filler neck of claim 39, wherein the cylindrical fill tube includes an annular top edge, the upstanding nozzle fingers each include an inner end cantilevered to the annular top edge and a free end, and the nozzle upstanding nozzle finger are arranged to lie in circumferentially space-apart related along the annular top edge of the cylindrical fill tube to project toward the mouth of the conduit.

41. The filler neck of claim 39, wherein at least one of the upstanding nozzle fingers includes a blade having an inner end cantilevered to the cylindrical fill tube and a free end positioned to lie in spaced-apart relation to the cylindrical fill tube and in confronting relation to the mouth of the conduit and a drive lug appended to the free end of the blade and arranged to engage a fuel-dispensing nozzle inserted into the mouth of the conduit during movement of the filler neck shuttle from its channel-opening position to its channel-closing position.

42. The filler neck of claim 32, wherein the partition channel has a first lateral width and the fill passageway has a second lateral width that is less than the first lateral width.

43. The filler neck of claim 32, wherein the fuel-discharging outlet of the filler neck shuttle is formed for extension through the partition channel and into the inner chamber.

44. The filler neck of claim 43, wherein the fuel-discharging outlet is positioned to lie substantially perpendicular to the nozzle-receiving inlet.

45. A filler neck for use in delivering fuel to a vehicle fuel tank, the filler neck comprising
a conduit including an outer end formed to include a mouth, an inner end formed to include a conduit outlet adapted to be coupled to a fuel tank inlet, and a neck passageway extending between the mouth and the conduit outlet,
a partition unit positioned in the conduit to divide the neck passageway into an outer chamber communicating with the mouth and an inner chamber communicating with the conduit outlet, the partition unit including a frame formed to include a partition channel extending therethrough and interconnecting the outer and inner chambers, a first seal ring mounted on the frame to lie in the partition channel, and a second seal ring mounted on the frame to lie in the partition channel in axially spaced-apart relation to the first seal ring, and
a filler neck shuttle positioned for movement in the neck passageway and the partition channel between a channel-opening position and a channel-closing position, the filler neck shuttle engaging the first and second seal rings upon movement of the filler neck shuttle to the channel-closing position, the filler neck shuttle being formed to include a nozzle-receiving inlet positioned to face toward the mouth of the conduit, a fuel-discharging outlet positioned to lie in a space in the partition channel between the first and second seal rings upon movement of the filler neck shuttle to the channel-closing position and to communicate with the inner chamber upon movement of the filler neck shuttle to the channel-opening position, and a fill passageway extending between the nozzle-receiving inlet and the fuel-discharging outlet.

46. The filler neck of claim 45, further comprising a spring yieldably urging the filler neck shuttle in the neck passageway toward the mouth of the conduit and into engagement with the partition unit to place the filler neck shuttle in the channel-closing position to block flow of liquid fuel and fuel vapor extant in the fill passageway formed in the filler neck shuttle into the inner chamber formed in the conduit.

47. The filler neck of claim 46, wherein the spring is positioned to lie in the neck passageway between the mouth and the second seal ring.

48. The filler neck of claim 45, wherein the filler neck shuttle includes a side wall formed to include the fuel-discharging outlet, and the frame, first seal ring, second seal ring, and filler neck shuttle cooperate to define a sealed chamber receiving liquid fuel extant in the fill passageway through the fuel-discharging outlet formed in the side wall while the filler neck shuttle remains in the channel-closing position and discharging said liquid fuel into the inner chamber formed in the conduit during movement of the filler neck shuttle toward the channel-opening position.

49. The filler neck of claim 48, wherein the filler neck shuttle further includes means in the fill passageway for directing liquid fuel discharged from a fuel-dispensing nozzle inserted into the fill passageway into the sealed chamber through the fuel-discharging outlet.

50. The filler neck of claim 48, wherein the filler neck shuttle further includes a valve body formed to include a vent passageway having an outlet communicating with the sealed chamber upon movement of the filler neck shuttle to the channel-closing position and an inlet communicating with the inner chamber formed in the conduit and at least one vent valve assembly in the vent passageway formed in the valve body.

51. The filler neck of claim 45, wherein the filler neck shuttle includes pressure-relief means for venting pressurized fuel vapor from the inner chamber formed in the conduit to the fill passageway for discharge from the filler neck while the filler neck shuttle remains in the channel-closing position and in engagement with the first seal ring mounted on the frame so that excess fuel vapor extant in the inner chamber formed in the conduit is dissipated.

52. The filler neck of claim 45, wherein the filler neck shuttle includes vacuum-relief means for admitting ambient air extant in the fill passageway into the inner chamber formed in the conduit when the pressure in the inner chamber exceeds a predetermined negative pressure and while the filler neck shuttle remains in the channel-closing position and in engagement with the first seal ring mounted on the frame so that unwanted vacuum in the inner chamber is dissipated.

53. A filler neck for use in delivering fuel to a vehicle fuel tank, the filler neck comprising
a conduit including an outer end formed to include a mouth, an inner end formed to include a conduit outlet adapted to be coupled to a fuel tank inlet, and a neck passageway extending between the mouth and the conduit outlet,
a partition unit positioned in the conduit to divide the neck passageway into an outer chamber communicating with the mouth and an inner chamber communicating with the conduit outlet, the partition unit being formed to include a partition channel extending therethrough and interconnecting the outer and inner chambers,
a filler neck shuttle positioned for movement in the neck passageway and the partition channel between a channel-opening position and a channel-closing position, the filler neck shuttle being formed to include a nozzle-receiving inlet positioned to face toward the mouth of the conduit, a fuel-discharging outlet configured for extension through the partition channel and into the inner chamber to deliver fuel thereto upon movement of the filler neck shuttle to the channel-opening position, and a fill passageway extending between the nozzle-receiving inlet and the fuel-discharging outlet, and
a spring yieldably urging the filler neck shuttle in the neck passageway toward the mouth of the conduit and into engagement with the partition unit to place the filler neck shuttle in the channel-closing position to block flow of liquid fuel and fuel vapor extant in the fill passageway formed in the filler neck shuttle into the inner chamber formed in the conduit.

54. The filler neck of claim 53, wherein the fuel-discharging outlet is formed to discharge fuel into the in the inner chamber in a radially outward direction.

* * * * *